United States Patent [19]

Kubota

[11] Patent Number: 4,591,324
[45] Date of Patent: May 27, 1986

[54] GRANULATING APPARATUS

[75] Inventor: Atsushi Kubota, Shizuoka, Japan

[73] Assignee: Okawara Mfg. Co., Ltd., Shizuoka, Japan

[21] Appl. No.: 601,241

[22] Filed: Apr. 17, 1984

[30] Foreign Application Priority Data

Apr. 19, 1983 [JP] Japan .................... 58-69805

[51] Int. Cl.⁴ .......................... B29C 67/02; F26B 3/16
[52] U.S. Cl. ..................................... 425/222; 34/57 E; 425/472
[58] Field of Search .................. 425/10, 68, 445, 446, 425/472, 222; 34/57 E, 56, 57 R; 264/37

[56] References Cited

U.S. PATENT DOCUMENTS

| | | | |
|---|---|---|---|
| 2,924,887 | 2/1960 | Marshall | 34/57 E |
| 3,207,824 | 9/1965 | Wurster et al. | 264/117 |
| 3,529,359 | 9/1970 | Fukuyo | 34/57 E |
| 3,632,257 | 1/1972 | Ashizawa | 264/117 |
| 3,879,855 | 4/1975 | Weiser et al. | 34/57 R |
| 3,880,968 | 4/1975 | Kaspar et al. | 264/37 |
| 4,073,838 | 2/1978 | Barnickel et al. | 264/37 |

FOREIGN PATENT DOCUMENTS 49-98380 9/1974 Japan .

OTHER PUBLICATIONS

Anon., Webster's New World Dictionary, World Pub. N.Y., (1957), pp. 628 and 631.

Primary Examiner—Willard E. Hoag
Attorney, Agent, or Firm—Schwartz, Jeffery, Schwaab, Mack, Blumenthal & Evans

[57] ABSTRACT

A granulating apparatus for continuously producing granules from powdery particles. The granulation chamber of the granulator comprises a feeder for supplying powdery particles to the granulation chamber and a spray nozzle for ejecting a binder solution on the powdery particles held in the granulation chamber. Powdery particles-drying hot gas is supplied from the bottom of the granulation chamber so as to vortically flow upward through the granulation chamber. The centrifugal force of the vortically flowing hot gas causes fully grown granules having a larger diameter to be distributed toward the peripheral wall of the granulation chamber. The granules fully grown to a prescribed diameter are selectively and continuously conveyed to a drying chamber through an outlet port formed in the peripheral wall of the granulation chamber. The granules thus brought are thoroughly dried in the drying chamber. In this way, powdery particles fully grown to granules having a prescribed size in a granulation chamber can be selectively and continuously discharged.

11 Claims, 4 Drawing Figures

GRANULATING APPARATUS

BACKGROUND OF THE INVENTION

This invention relates to a granulating apparatus or pelletizer for manufacturing granular particles like those of medicine, instant soup, livestock feed, etc., from powdery raw material.

A granulating apparatus or pelletizer known to date comprises means for carrying out the steps of spraying a binder solution on raw particles to bond them together, drying the bonded granules, and later again spraying the binder solution on the dried bonded granules. In the granulating or pelletizing chamber of the conventional granulating apparatus or pelletizer, involving the above-mentioned steps, hot air is introduced only upwardly from below a fluidized bed or layer of raw particles for their drying. The raw particles constituting the fluidized bed are kept floating in such a condition that a balance is established between the force of heated air blowing particles upward and the gravitational force letting the particles fall. In this case, those particles which have a great apparent density, that is, a heavier weight, float in the lower portion of the fluidized bed, whereas those particles of small apparent density, that is, a lighter weight, remain in the upper portion of the fluidized bed. The particles constituting the upper portion of the fluidized bed, which are wetted by binder solution, sprayed by an atomizer, increase in apparent density and fall downward and are handled as bonded heavy particles. When the particles wetted by a binder solution are dried by an upward flowing hot air stream, the solvent of the binder solution is evaporated, thereby reducing the apparent density of the particles. As a result, the particles which are now rendered light move upward. The rising particles are again wetted by the binder solution to increase weight and bond with other adjacent particles while falling downward. As described above, raw particles in the fluidized bed are repeatedly wetted by the binder solution and bonded with other adjacent particles to gradually grow into large granules having prescribed measurements.

A granulating apparatus or pelletizer known to date is only a batch type. Namely, the conventional granulating apparatus or pelletizer is characterized in that when raw particles grow into granules having a prescribed diameter, the apparatus is brought to rest to remove all the particles from a pelletizer tank. However, the failure to apply a continuous process is for the reason that when particles are taken out during operation from the upper portion of a fluidized bed held in the pelletizer tank, insufficiently pelletized particles are undesirably withdrawn; and when particles are removed during the operation from the lower portion of the fluidized bed, moistened particles still wet from the binder solution are discharged; namely, it has been impossible to continuously take out particles having a prescribed diameter from the pelletizer. Therefore, the conventional granulating apparatus or pelletizer is accompanied with the drawback that the batch process has reduced production efficiency.

SUMMARY OF THE INVENTION

This invention has been accomplished in view of the above-mentioned circumstances, and is intended to provide a pelletizer capable of being efficiently operated and continuously producing particles of uniform diameter.

To attain the above-mentioned object, a granulating apparatus for continuously producing fully grown granules from powdery particles is provided, which comprises:

a body having a peripheral wall defining a granulating chamber;

means for feeding raw powdery particles to the granulation chamber;

binder solution-feeding means which is set above the granulation chamber to spray a binder solution on the raw powdery particles held in the granulation chamber;

gas-feeding means for providing a gas to the granulation chamber to dry the fully grown granules held therein, said gas-feeding means being intended to supply a gas whirling upward through the granulation chamber, subject said whirling gas to a centrifugal force, and distribute granules of a larger diameter toward the peripheral wall of the granulation chamber;

means provided on the peripheral wall of the granulation chamber for removing the granules of a larger diameter which are drawn near said peripheral wall; and means for drying fully grown granules delivered from said granule-discharging means.

DETAILED DESCRIPTION OF THE PREFERRED EMBODIMENT

Figure 1:
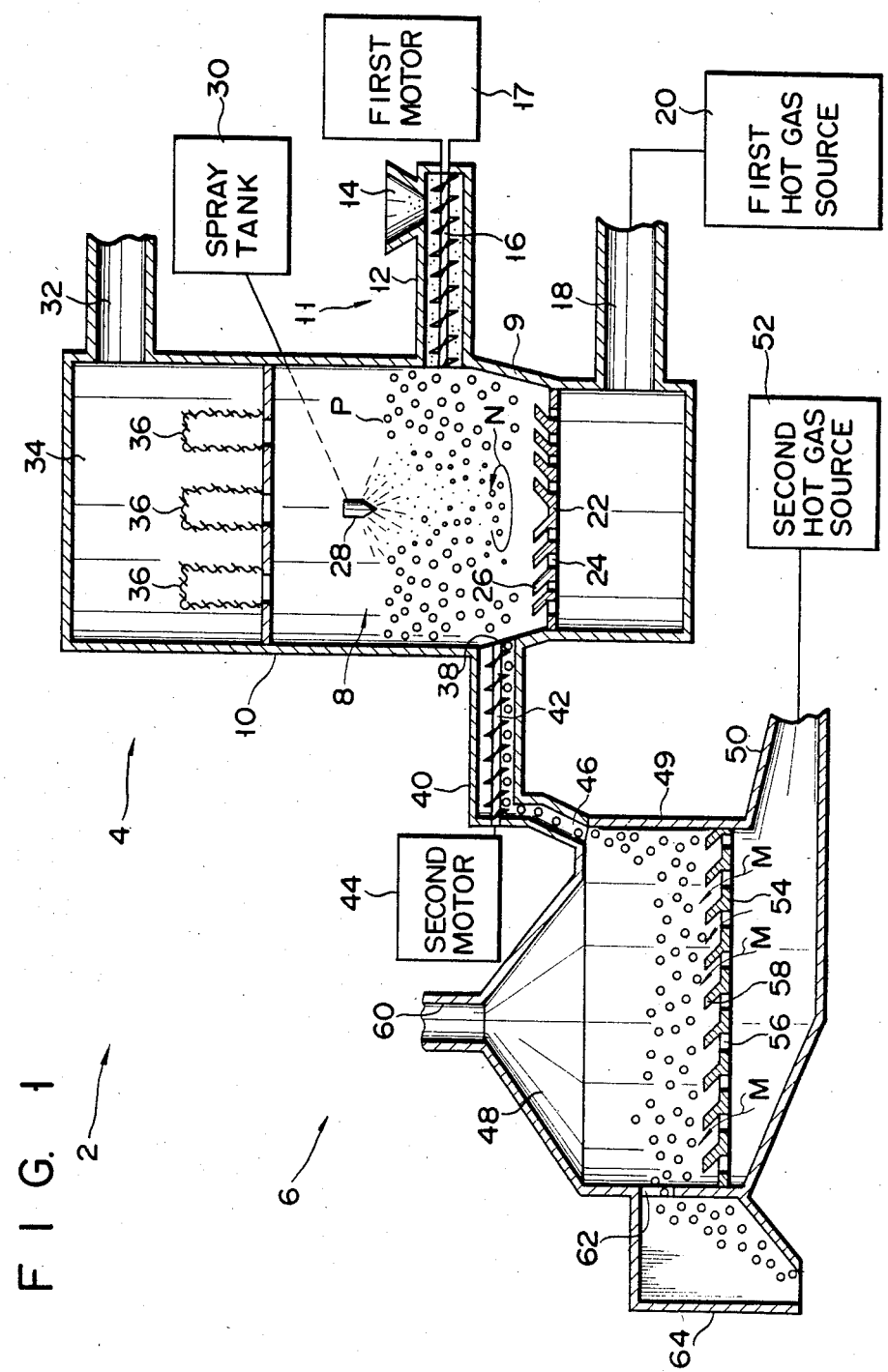
FIG. 1 is a schematic cross sectional view of a granulating apparatus embodying this invention.

A description may now be made with reference to the accompanying drawings of the granulating apparatus embodying this invention. The granulating apparatus 2 of this invention comprises a granulator 4 for continuously bonding together raw powdery particles into granules, and a dryer 6 for continuously drying granules delivered from the granulator 4.

The granulator 4 has a body 10 whose peripheral wall 9 defines an inverted frustum. The granulator body 10 is fitted with a raw, powdery particle feeder 11, which is provided with a powder-feeding duct 12. This powder-feeding duct 12 communicates with the granulation chamber 8 of said granulator body 10 at one end and is provided with a raw powdery particle-feeding hopper 14 at the other end. In the powder-feeding duct 12 is a screw or spiral 16 for supplying the powdery particles stored in the hopper 14 to the granulation chamber 8. The spiral 16 is driven by a first motor 17 fitted to one end of said spiral 16. Provided below the granulator body 10 is a hot gas duct 18 for conducting hot gas to the granulation chamber 8 from below to dry granules grown therein. The hot gas duct 18 communicates with the granulator body 10 at one end and also with a hot gas source 20 at the other end. This hot gas source is capable of controlling the temperature and flow rate of hot gas.

Figure 2:
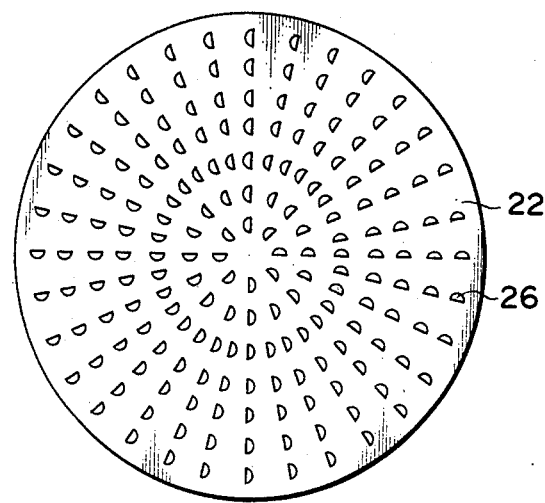
FIG. 2 is a plan view of a first distribution plate shown in FIG. 1.
Figure 3:
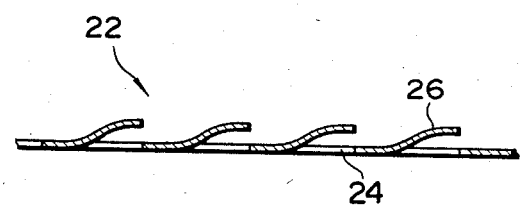
FIG. 3 is an enlarged partial cross sectional view of the first distribution plate of FIG. 2.
Figure 4:
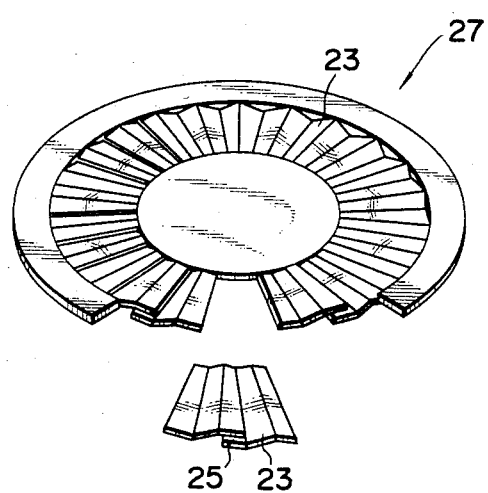
FIG. 4 is a perspective view of a second distribution plate.

Referring to the granulator body 10, a first distribution plate 22 is set above the hot gas duct 18 to supply the hot gas delivered from said hot gas duct 18 to the granulation chamber 8 in the form of vortical upward streams. As illustrated in FIG. 2, the first distribution plate 22 assumes a substantially circular shape. This first distribution plate 22 is penetrated by a large number of radially arranged holes 24. As seen from FIG. 3, a protrusion 26 is projectively formed on each penetrating hole 24 so as to cause hot gas streams to flow vortically through the granulation chamber 8 in the direction of arrow N. As shown in FIG. 4 another first distribution plate 27 may be used. In this case the first distribution plate 27 comprises circularly arranged plate 23, these plates 23 adjacent to each other define a space.

A spray nozzle 28 is set in the upper portion of the granulation chamber 8 to eject a binder solution toward the raw, powdery particles held in said granulation chamber 8. The binder solution is prepared from, for example, starch. A spray tank 30 connected to the spray nozzle 28 supplies the binder solution thereto.

Provided in the upper portion of the granulator body 10 is an exhaust duct 32 to draw off the hot gas supplied to the granulation chamber 8 from below. The exhaust duct 32 is fitted with a hot-gas flowrate controlling damper, temperature indicator, and humidity indicator (though not shown). The temperature and humidity of the hot gas supplied from the first hot air source 20 are controlled by output signals from said indicators. Provided between the exhaust duct 32 and spray nozzle 28 is a collection chamber 34 for trapping the dust and mist contained within the hot gas drawn off from the exhaust duct 32. A plurality of bag filters 36 are provided in the collection chamber 34 to previously filter the gas entering the collection chamber 34. Provided between the distribution plate 22 and the spray nozzle 28 is an outlet port 38 through which granules grown to a prescribed size are taken out. Said outlet port 38 is formed in the peripheral wall 9 of the granulation chamber 8.

The raw powdery particles in the granulation chamber 8 are subjected to a centrifugal force by the hot gas vertically flowing upward through the granulation chamber 8. Granules grown with a greater apparent density, namely heavy granules, are distributed outward. Therefore, granules grown to a larger size than prescribed are drawn to the peripheral wall 9 of the granulation chamber 8. Generally, the larger diameter of a granule, the greater its apparent density. Therefore, those of the raw powdery particles constituting the fluidized bed, which are fully grown to a prescribed size, are continuously taken out through the outlet port 38.

An outlet duct 40 is connected to the outlet port 38. Provided in said outlet duct 40 is a screw or spiral 42 to carry the fully grown granules from the outlet port 38 to the dryer 6. The spiral 42 is connected to a second motor 44 at one end to be driven thereby. Provided between the outlet duct 40 and dryer 60 is a chute 46 which enables fully grown granules, delivered through the outlet duct 40, to be continously brought into the later described drying chamber 48 of the dryer 6.

The peripheral wall 49 of the dryer 6 defines a drying chamber 48 to dry fully grown granules carried thereinto by hot gas streams blown into said drying chamber 48 from below. A second hot gas duct 50 communicates with the lower portion of the drying chamber 48 to dry the fully grown granules held in said drying chamber 48 by the hot gas supplied thereto from below. Said second hot gas duct 50 is connected to a second hot gas source 52. Provided between the drying chamber 48 and second hot gas duct 50 is a second distribution plate 54, the second distribution plate 54 is penetrated by a large number of radially arranged holes 56 slanted in the same direction and further comprises a large number of protuberances 58 projectively formed on each penetrating hole 56. Hot air streams drawn into the drying chamber 48 through said holes 56 slantwise flow upward in the direction indicated by arrow M.

An outlet duct 60 is provided in the upper portion of the dryer 6 to draw off the hot gas brought into said dryer 6. An outlet port 62 is formed in the peripheral wall 49 of the drying chamber 48 at a point above the second distribution plate 54. Adjacent to the drying chamber 48 is provided an outlet chamber 64 which communicates with the drying chamber 48 through the outlet port 62. Fully dried granules are taken out through the outlet port 62. Since hot gas flows slantwise upward through the drying chamber 48, the dried granules held in the drying chamber 48 are conveyed to the outlet port 62 by the slantwise flowing hot gas, and taken out through the outlet port 62 and the outlet chamber 64.

A description may now be made of the operation of a granulating apparatus embodying this invention. First, raw powdery particles are stored in a hopper 14. The spiral 16 in the powder-feeding duct 12 is rotated to conduct the powdery particles held in the hopper 14 to the granulation chamber 8. Hot gas from the first hot gas source 20 is brought into the granulation chamber 8 through the distribution plate 22. The hot gas vortically flows upward through the granulation chamber 8.

The peripheral wall 9 of the granulation chamber 8 is formed as an inverted frustum. Therefore, the upper portion of the granulation chamber 8 has a larger cross sectional area. When, therefore, upward-flowing hot gas is brought into the granulation chamber 8, the raw, powdery particles remaining in the lower portion of the granulation chamber 8 having a smaller cross sectional area undergo the greater force of the upward flowing hot gas. In contrast, the raw powdery particles held in the upper portion of the granulation chamber 8 are subject to the smaller force of the upward flowing hot gas. Since powdery particles tend to gravitationally fall, the particles remain floating at a point at which a balance is established between the gravitational force and the upward flowing force of hot gas. In other words, particles having a smaller apparent density float in the upper portion of the granulation chamber 8, and those having a great apparent density float in the lower portion of the granulation chamber 8. Raw, powdery particles held in the granulation chamber 8 by the introduced hot gas constitute a fluidized bed. A binder solution is sprayed from the nozzle 28 on the powdery particles constituting the upper portion of the fluidized bed. This binder solution is prepared from, for example, starch. When wetted by a binder solution ejected from the spray nozzle 28, the powdery particles constituting the upper portion of the fluidized bed increase in apparent density. The heavy, powdery particles are bonded together while moving toward the lower portion of the fluidized layer. When fully dried by hot gas, the particles bonded together into granules are reduced in apparent density by the weight of the solvent of the binder solution which has been evaporated by the heat of the hot gas. As a result, the fully dried particles move upward. While repeating the above-mentioned upward and downward movements, the particles are gradually grown into granules of a prescribed size.

Since the hot gas vortically flows upward through the granulation chamber 8, the fluidized bed of powder particles also whirls in said chamber 8. During the vortical flow, particles having a greater density, that is, a larger size, are distributed toward the outside by the centrifugal force of the vortically-flowing hot gas. Therefore, powdery particles bonded together into granules having a prescribed size reach the peripheral wall 9 of the granulation chamber 8, and are taken into the outlet port 38 formed in said peripheral wall 9. Namely, granules grown to a prescribed diameter are continuously carried into the outlet port 38. The fully grown granules taken into the outlet port 38 are continuously delivered to the dryer 6 by means of the spiral 42 and chute 46. The application of the dryer 6 is required because powdery particles wetted by the binder solution and bonded together into granules still remain moistened at this time and have to be thoroughly dried by the dryer 6.

The granules are dried in the dryer 6 by the hot gas supplied from the second hot gas source 52. In the drying chamber 48, the granules are continuously dried and moved to the outlet port 62 by the hot gas flowing slantwise upward.

The flow rate of a hot gas taken into the granulation chamber 8 is defined chiefly in accordance with the diameter and apparent density of the raw, powdery particles. The temperature and humidity of the hot gas are determined in accordance with the kind and concentration of a granulating binder solution sprayed from the spray nozzle 28. The flow rate of hot gas taken into the drying chamber 48 is similarly defined in accordance with the diameter and apparent density of the raw powdery particles. The temperature of hot gas is specified by the rate at which the granules wetted by the binder solution have to be dried or the temperature of the granules as taken out of the outlet port. The gas applied to the drying chamber need not be limited to hot gas, but may consist of cool gas.

An example which produced livestock feed with the above-mentioned embodiment of the invention follows.
Raw powder particles composition:
  non-fat milk powder: 30 weight %
  corn powder: 20 weight %
  flour: 20 weight %
  others: 30 weight %
Size of the raw powder particles: mean particle diameters $\bar{d}_{50} = 0.25$ mm ~ 0.35 mm
Hot gas supplied from first hot gas source:
  gas flow rate: $\mu = 1.8$ m/sec.
  gas temperature: $t = 60° \sim 85°$
Hot gas supplied from second hot gas source:
  gas flow rate: $\mu = 0.8$ m/sec.
  gas temperature: $t = 20°$ C.
Volume of the granulation chamber: 5.5 m$^3$
Area of the first distribution plate: 1.0 m$^2$
Area of the second distribution plate: 1.0 m$^2$
Granules as products: mean particle diameters $\bar{d}_{50} = 0.4$ mm ~ 0.5 mm
Composition of binder solution
  fat and oil: 20 ~ 60 weight %
  water: 79 ~ 39 weight %
  emulsifer: 1 weight %
Productivity of granules: 500 kg/h The granulating apparatus embodying this invention offers the advantages that raw, powdery particles held in the granulation chamber 8 which have grown to a prescribed diameter are taken out in rapid succession, and prevented from being respectively grown to any unnecessary, larger size and also being bonded together into lumps, thereby ensuring the manufacture of granules having a uniform diameter; and the subject granulating apparatus allows for continuous operation, thus saving manpower and realizing highly efficient production.

It will be noted that this invention is not limited to the aforementioned embodiment, but may be practised with various changes and modifications without departing from the object. For instance, the foregoing embodiment referred to the case where the distribution plate was so perforated as to cause the passing gas to make a vortical flow. However, this invention is not limited to this process. But the same effect can be realized by causing the gas to flow around the peripheral wall of the granulation chamber, thereby producing vortical streams.

A screw or spiral was provided in the outlet duct to deliver fully grown granules from the granulation chamber to the drying chamber. However, the spiral can be dispensed with because fully grown granules quickly brought into the outlet port at a prescribed speed can be directly delivered to the drying chamber. Further, the foregoing embodiment referred to the case where a single spray nozzle was applied. Instead, two or more spray nozzles may be provided.

In the drying chamber 48, a plurality of screens for forming a plurality of chambers may be provided to extend the residence time of the granular particles.

What is claimed is:

1. A granulating apparatus for continuously producing granules each having a predetermined size from powdery particles which comprises:
   a body having a peripheral wall defining a granulation chamber;
   means for feeding raw powdery particles to the granulation chamber;
   binder solution-feeding means which is set inside of the granulation chamber to spray a binder solution on the raw powdery particles held in the granulation chamber to form granules;
   gas-feeding means for introducing a whirling upward flow of gas adjacent to the granulation chamber, subjecting the formed granules to a centrifugal force and distributing granules of said predetermined size toward the peripheral wall of the granulation chamber; said gas flow at least partially drying granules in said granulation chamber;
   granule discharging means provided in the peripheral wall of the granulation chamber to take out granules of said predetermined size which are drawn near said peripheral wall; and
   means for drying fully formed granules which are continuously delivered from said granule discharging means.

2. The granulating apparatus according to claim 1, wherein the gas-feeding means is provided with a distribution plate which controls the streaming direction of the gas so as to cause it to vortically flow upward through the granulation chamber; and the gas is brought into the granulation chamber through said distribution plate.

3. The granulating apparatus according to claim 1, wherein the peripheral wall defining the granulation chamber is shaped like an inverted frustum, thereby subjecting the gas occupying the upper region of the granulation chamber to a smaller upward lifting force.

4. The granulating apparatus according to claim 1, wherein the body has a dust-mist collecting chamber provided in the upper region of the granulation chamber, and the gas supplied to the granulation chamber is drawn out through said dust-mist collecting chamber.

5. The granulating apparatus according to claim 4, wherein the dust-mist collecting chamber comprises a replaceable bag filter.

6. The granulating apparatus according to claim 1, wherein the granule-discharging means comprises an outlet port formed in the peripheral wall of the granulation chamber, and the fully grown granules are thrown into said outlet port by the centrifugal force of the hot gas.

7. The granulating apparatus according to claim 6, wherein said granule-discharging means is provided with an outlet duct which communicates with the dryer, and is connected to the outlet port at one end and also to the dryer at the other end, and a spiral is provided in the outlet duct to convey the fully grown granules from the outlet port to the dryer.

8. The granulating apparatus according to claim 1, wherein the binder solution-feeding means comprises a spray nozzle for spraying the binder solution on the raw powdery particles.

9. The granulating apparatus according to claim 1, wherein the dryer comprises second gas-feeding means for causing a hot gas to flow slantwise upward through the drying chamber, thereby drying the fully grown granules brought into said drying chamber in a fluidized state, and carrying the granules to the outlet from the inlet thereof.

10. The granulating apparatus according to claim 1, wherein said second gas-feeding means is provided with a distribution plate which controls the streaming direction of the hot gas so as to cause it to flow slantwise upward.

11. A granulating apparatus for continuously producing granules each having a predetermined size from powdery particles which comprises:
   a body having a peripheral wall defining a granulation chamber;
   means for feeding raw powdery particles to the granulation chamber;
   binder solution-feeding means positioned centrally above the raw powdery particles in the granulation chamber to spray a binder solution on the raw powdery particles held in the granulation chamber to form granules;
   gas-feeding means for introducing a whirling upward flow of gas into the granulation chamber, subjecting the formed granules to a centrifugal force and distributing granules of said predetermined size toward the peripheral wall of the granulation chamber; said gas flow at least partially drying granules in said granulation chamber;
   granule discharging means provided adjacent the peripheral wall of the granulation chamber to take out granules of said predetermined size which are drawn near said peripheral wall; and
   means for drying fully formed granules which are continuously delivered from said granule discharging means.

* * * * *